No. 667,240. Patented Feb. 5, 1901.
H. A. MEYER.
ADJUSTING DEVICE FOR FABRIC CUTTING MACHINES.
(Application filed Nov. 16, 1900.)
(No Model.)
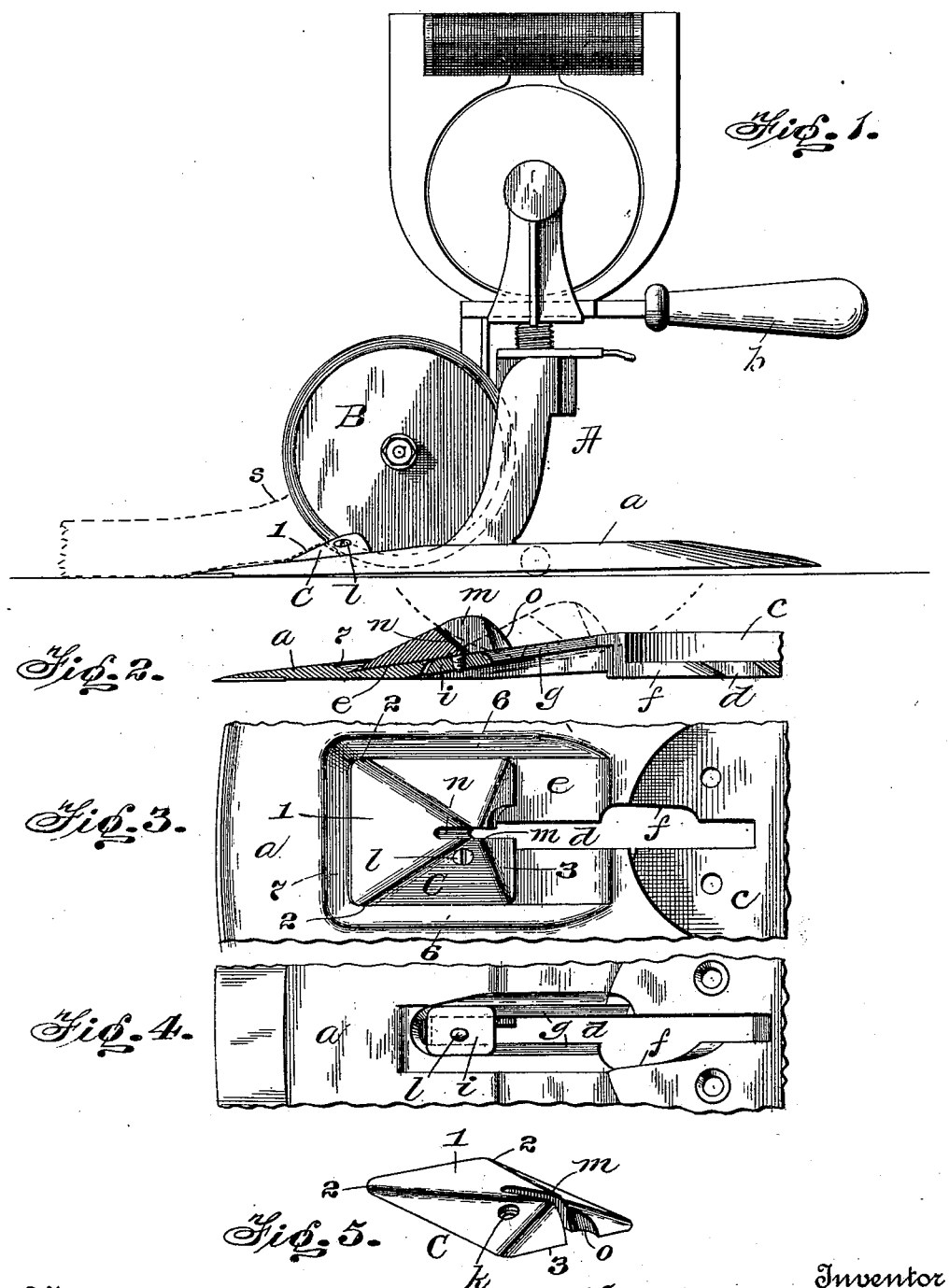
Witnesses
Inventor
Henry A. Meyer
By His Attorney

UNITED STATES PATENT OFFICE.

HENRY A. MEYER, OF CINCINNATI, OHIO, ASSIGNOR TO THE WOLF ELECTRICAL PROMOTING COMPANY, OF SAME PLACE.

ADJUSTING DEVICE FOR FABRIC-CUTTING MACHINES.

SPECIFICATION forming part of Letters Patent No. 667,240, dated February 5, 1901.

Application filed November 16, 1900. Serial No. 36,727. (No model.)

*To all whom it may concern:*

Be it known that I, HENRY A. MEYER, a citizen of the United States, residing at Cincinnati, in the county of Hamilton and State of Ohio, have invented certain new and useful Improvements in Adjusting Devices for Fabric-Cutting Machines; and I do hereby declare the following to be a full, clear, and exact description of the invention, such as will enable others skilled in the art to which it appertains to make and use the same.

This invention relates to machines for cutting textile and other fabrics; and it consists, substantially, in the improvements hereinafter more particularly described, and pointed out in the claims.

In the art of cutting fabrics to pattern it is usual in some instances to employ a reciprocating cutter and in others a rotary cutter, the selection depending somewhat upon the nature or character of material to be operated upon. With a rotary cutter, however, the degree of penetration thereof is greatest at the topmost layer of fabric and gradually becomes less for each succeeding layer beneath. Hence there is a corresponding variation in the size of the cut fabric produced, which is undesirable. This difference of penetration of the cutter is of course due to the curvature of the cutting edge thereof, which fact has resulted in the use of contrivances or devices for presenting the fabric layers to the cutter in such manner that the layers are cut to practically an equal depth or degree. With such former devices, however, it is usually necessary in some instances to lower the entire machine, including the cutter, in order to take up or compensate for wear of the cutter, and in other instances the fabric layers are presented to the cutter necessarily at a a somewhat different angle each time an adjustment is made. In the latter case the depth of cut is of course not the same for different superposed layers of fabric operated upon.

The object of the present invention is to overcome the objections above mentioned and to provide an adjustable cloth-lifter for compensating for the wear of the cutter and also for keeping or maintaining the fabric layers at the same angle to the cutter irrespective of the extent or frequency of adjustment of said lifting device.

The above and additional objects I attain by the means illustrated in the accompanying drawings, in which—

Figure 1 is a diagrammatic view of a rotary cloth-cutting machine of well-known form, the same having my improvements in connection therewith. Fig. 2 is an enlarged sectional view, broken off at one end, of the foot-plate of the machine, showing my improved cloth-lifter adjustably fitted thereon. Fig. 3 is a top plan view of Fig. 2, and Fig. 4 is a bottom plan view thereof. Fig. 5 is a view in perspective of the adjustable cloth-lifter detached.

Preliminary to a more detailed description and as distinguishing my improved adjustable cloth-lifting device from what has been heretofore devised for a similar purpose I desire to state that said device is located in any suitable manner upon the foot-plate in front of the rotary cutter, and the same is slotted, so as to partially receive the cutter as the latter rotates. The said lifting device is practically pyramidal in shape, being inclined upwardly both forwardly and at the sides, the inner or rear end thereof being more abruptly inclined, or even straight, if desired. Said device has a flat or straight base and is adjustable toward and away from the cutter on an inclined plane, so that the edge of the fabric layers will always be presented to said cutter at the same angle irrespective of the extent of such adjustments.

Specific reference being made to the drawings, A represents a conventional form of rotary fabric-cutting machine, mounted, as usual, upon a foot-plate $a$, the forward end of which enters beneath the lowermost layer of fabric and serves to lift the pile of fabric layers thereon to be cut out by the rotary cutter B, which latter is operated in any suitable manner from an electric or other motor. (Not shown.) To follow the pattern to which the fabric layers are to be cut, the machine is moved about upon the supporting-table by means of the handle shown at $b$. The said foot-plate $a$ may or may not be formed in its upper surface with a recess $c$ for the reception of a base-plate (not shown) on the lower end of the standard of the machine; but an elongated opening $d$ is preferably formed in said plate to give ample clearance to the cutting edge of the cutter B and also for the free passage or escape of small cuttings or threads which may be carried down by the said cutter as it cuts into and severs the cloth layers. Directly in front of the edge of the rotary cutter the said foot-plate $a$ is provided with an inclined plane $e$, which extends upwardly on either side of the slot or opening $d$ for a suitable distance and the upper end of which terminates at a point within the peripheral edge of the cutter. In this way the said inclined plane $e$ lies partly on one side of said cutter and partly on the other for a fraction of its length. As will be observed, the slot or opening $d$ in the foot-plate $a$ is widened at $f$, and from such widened portion outwardly the under side of the plate is beveled at $g$ on each side of the said slot $d$, so as to form a guide in which moves the nut $i$, which serves to tighten the adjustable cloth-lifter C at different points of adjustment. The said cloth-lifting device consists of practically a pyramidal block, which is guided upon the inclined plane $e$ in any suitable manner so as to be adjustable forwardly relative to the edge of the rotary cutter, and the same is formed with an opening $k$, receiving a screw $l$, the end of which enters or screws into the nut $i$, which is prevented from turning by means of the beveled sides of the guide in which it moves. The said block or cloth-lifting device C is inclined upwardly at 1 in the direction of the peripheral edge of the cutter, and the same is likewise inclined upwardly and forwardly at the sides from each outer corner of the device, as indicated at 2 2. This gives to the front and sides of the device each an incline of gradually-diminishing width, while the inner or rear end 3 thereof may be either more abruptly inclined or perfectly straight, as desired. Said device is also formed with a slot $m$, into which the cutter extends, the base of said slot being preferably inclined at $n$, so as to conform as nearly as possible to the cutting edge of the cutter and to reach beneath such edge for some distance, so as to partially protect the same and also to leave sufficient stock of material for the formation of the screw hole or opening $k$. At the inner extremity of said slot $m$, at one side, a semicircular notch $o$ is formed in the block, which notch gradually widens or enlarges toward the bottom to facilitate the escape of dirt particles, as well as small threads and ravelings, which may be drawn or pulled from the fabric by the cutter. Said adjustable lifting device may be guided in any suitable way; but preferably I form the inclined plane $e$ by recessing or cutting out the foot-plate $a$ on its upper surface, which leaves the sloping or inclined walls 6 6 and 7 at the sides and lower end of said plane, respectively, and the block or lifting device is cut or shaped to exactly fit between these walls, the said lower wall serving as a stop limiting the downward movement of said block. The upper end of said inclined plane gradually merges or disappears into the upper surface of the said foot-plate $a$. At $s$ in Fig. 1 the position in which the fabric layers are constantly held before the cutter is shown in dotted lines. In virtue of the fact that the block or cloth-lifting device C is adjustable on an incline it will be seen that compensation is thus made for the gradually-decreasing depth of the block and that the cloth is always presented to the cutter at practically the same angle irrespective of the adjustments of said block. In former devices for this purpose the lifter has in most instances been adjustable on a horizontal plane, and by reason of the gradually-decreasing height of the same the cloth layers were brought to a different angle to the cutter each time an adjustment was made, and thus the depth of cut could not be the same for different fabric layers, or even for the same fabric layers in some instances. By the use of my improved device all this is overcome and the depth of cut is made to be equal at all times, except, of course, when certain adjustments may be made of the cutter itself for the purpose of altering the degree of penetration of said cutter.

The purpose in cutting out or recessing the upper surface of the foot-plate to form the inclined plane is to give to such plane as low a position as possible, so that the edge of the fabric layers will only require to be turned upward toward the cutter at a very slight angle. By this means also a greater number of fabric layers can be cut at one time with a cutter of predetermined curvature or diameter than if the said plane was elevated above the surface of the foot-plate.

In thus describing the features and the advantages possessed by my improved cloth-lifting block I have not overlooked the fact that it has heretofore been suggested to provide a block for this purpose having inclined sides and being elevated at its inner end by means of a beveled washer placed or inserted beneath the block upon the foot-plate. Such a construction is obviously more expensive than the present, being much more difficult to make and also consuming considerable time in effecting the desired adjustments.

In operation the inner abrupt end 3 of the pyramidal block or lifting device C permits the material or fabrics to again assume a flat or horizontal position after being cut, while the sides 2 2 thereof tend to spread or separate the severed or divided portions of the fabric, so as to carry the same away from the cutter. The forwardly and upwardly inclined side 1 of said block causes the edge of the fabric layers to be turned upwardly to the edge of the cutter, as shown in dotted lines, Fig. 1, so that the layers are all cut practically to the same depth or extent. It is of course obvious that other means for adjusting the said block or lifter C can be resorted to, if desired. It is further obvious that to adjust the block or lifter by the devices shown it is simply necessary to loosen the nut $i$, whereupon the same can be again tightened after the block has been moved or adjusted to the desired extent.

Having thus fully described my invention, what I claim as new, and desire to secure by Letters Patent of the United States, is—

1. In a fabric-cutting machine, the foot-plate having an inclined plane located in front of the cutter, and an inclined block or cloth-lifting device slotted to partially receive said cutter and being adjustable on said plane, substantially as described.

2. In a fabric-cutting machine, the foot-plate having an inclined plane or surface located in front of the cutter, and a cloth-lifting device adjustable on said plane and having a straight or flat base and inclined sides, substantially as described.

3. In a fabric-cutting machine, the foot-plate having an inclined plane or surface thereon located in front of the cutter, and having walls at the sides and lower end thereof, and a cloth-lifting device adjustable on said plane between its sides, substantially as described.

4. In a fabric-cutting machine, the foot-plate having an inclined plane thereon in front of the cutter, the same having walls at the sides and lower end thereof, and a cloth-lifting device adjustable on said plane between its walls and having inclined sides, substantially as described.

5. In a fabric-cutting machine, the foot-plate having an inclined plane thereon in front of the cutter, the same having side guides, and a cloth-lifting device or block adjustable on said plane between said guides, substantially as described.

6. In a fabric-cutting machine, the foot-plate having an inclined plane thereon in front of the cutter, the same having side guides and a stop at the lower end thereof, and a cloth-lifting device or block adjustable on said plane between said guides, substantially as described.

7. In a fabric-cutting machine, the foot-plate having an inclined plane thereon in front of the cutter, the same having side guides, and a cloth-lifting block or device adjustable on said plane between the guides, said device being inclined forwardly and at the sides and having its inner end terminating abruptly, as shown and described.

8. In a fabric-cutting machine, the foot-plate having an inclined plane thereon in front of the cutter, and an inclined block or cloth-lifting device adjustable on said plane and slotted to partially receive said cutter, the said device having a notch at one side of the slot thereon at the inner end, substantially as described.

9. In a fabric-cutting machine, the foot-plate having a slot therein, and having an inclined plane thereon in front of the cutter, the under side of said plate being beveled at opposite edges of the slot therein, an inclined cloth-lifting device working upon said plane, a screw passing through the same and through the slot in said foot-plate, and a nut located between the beveled portions of the foot-plate and receiving the end of said screw, substantially as described.

10. In a fabric-cutting machine, the foot-plate having an inclined plane thereon in front of the cutter, the same having side guides, and a cloth-lifting device adjustable on said plane between the guides, said device having inclined sides and a flat or straight base, substantially as described.

11. In a fabric-cutting machine, the combination with the foot-plate recessed in its upper surface to form an inclined plane having walls at the sides and lower ends thereof, of an adjustable block or cloth-lifting plate adjustable on said plane between said walls, substantially as described.

12. In a fabric-cutting machine, the combination with the foot-plate recessed in its upper surface to form an inclined plane having walls at the sides and lower end thereof, said plate having a slot dividing said inclined plane from the upper end thereof for a part of its length, of a cloth-lifting block or device adjustable on said plane, and a screw and nut for securing the same at different adjustments, substantially as described.

13. In a fabric-cutting machine, the foot-plate thereof having an inclined plane extending upwardly toward the forward edge of the cutter, and with the highest point thereof practically even with the surface of said foot-plate, and a cloth-lifting device adjustable on said inclined plane, substantially as described.

In testimony whereof I affix my signature in presence of two witnesses.

HENRY A. MEYER.

Witnesses:
JOS. H. LITTELL,
DAVE W. WERTHEIM.